United States Patent [19]
Treichel et al.

[11] Patent Number: 4,506,560
[45] Date of Patent: Mar. 26, 1985

[54] CONTROL LINKAGE

[75] Inventors: Richard Treichel, Cedar Falls; Daniel M. Johnson, Waterloo, both of Iowa

[73] Assignee: Deere & Company, Moline, Ill.

[21] Appl. No.: 450,878

[22] Filed: Dec. 20, 1982

[51] Int. Cl.$^3$ .............................................. G05G 9/16
[52] U.S. Cl. ................................... 74/473 R; 74/110; 180/336
[58] Field of Search ............................ 74/110, 473 R; 180/89.14, 327, 328, 336

[56] References Cited

U.S. PATENT DOCUMENTS

| | | | |
|---|---|---|---|
| 2,924,988 | 2/1960 | Primeau | 74/473 R |
| 2,989,876 | 6/1961 | Rasmussen | 74/473 R |
| 3,218,874 | 11/1965 | Gerstenhauer | 74/110 |
| 3,616,709 | 11/1971 | Malm | 74/473 R |
| 3,795,157 | 3/1974 | Campbell | 74/473 R X |
| 3,955,437 | 5/1976 | Heintz | 74/473 R |
| 4,137,790 | 2/1979 | Hiraiwa | 74/473 R |
| 4,156,474 | 5/1979 | Aida | 180/89.14 X |

Primary Examiner—Allan D. Herrmann

[57] ABSTRACT

A control linkage is disclosed for a vehicle such that the vehicle's transmission can be connected to a shift lever located in an isolated cab structure. Movement of the shift lever will obtain corresponding shifting of gear ratios within the transmission. The control linkage permits such shifting while compensating for relative motion between the cab structure and the transmission. The control linkage includes a rotatable shaft which is secured between the cab structure and the transmission and which is also capable of angularly moving relative to both structures. A sleeve is positioned about the support shaft and is secured to it so that both can rotate simultaneously. Extending radially outward from the sleeve is a pair of arms, both of which contain a spherical attachment member positioned adjacent to their outer ends. Attached to these spherical connections are first and second rods which are aligned approximately perpendicular to the support shaft. The first rod connects the shift lever to one of the arms while the second rod connects the transmission to the other arm. As relative motion occurs, the support shaft will pivot about one of its ends such that the displacement of the second rod will be less than that needed to displace the gear shift mechanism an undesirable amount.

5 Claims, 4 Drawing Figures

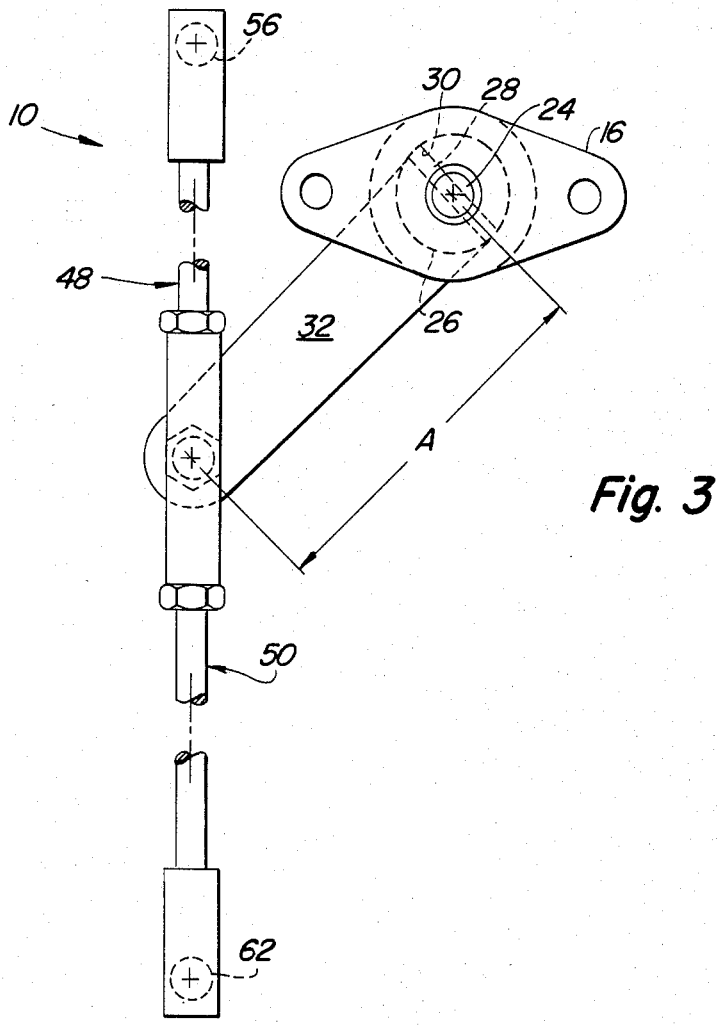
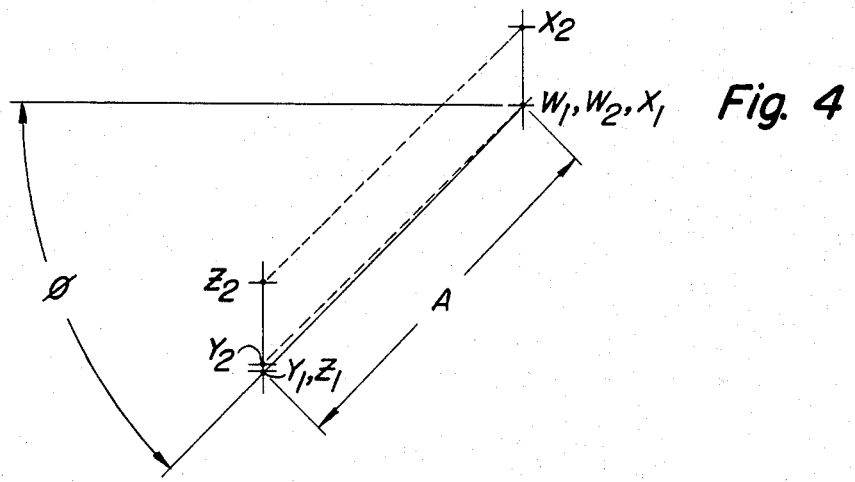
Fig. 3
Fig. 4

CONTROL LINKAGE

FIELD OF THE INVENTION

This invention relates to a control linkage for connecting a shift lever to a vehicle's transmission and more particularly, to a control linkage which compensates for relative motion between the shift lever and the transmission such that displacement of the gear shift mechanism, which is connected to the transmission, is avoided.

BACKGROUND OF THE INVENTION

Presently, many agricultural and industrial vehicles are equipped with a cab structure which is mounted to the frame of the vehicle by isolating members, such as shock absorbers or rubber mounts. In such vehicles, the transmission is normally fixed secure to the frame while the controls for the transmission are positioned within the cab structure. This setup presents a problem in that the control linkage, which connects the shift lever to the transmission, experiences unwanted motion as the vehicle moves over uneven terrain. Such motion becomes detrimental to the operation of the vehicle when it is large enough to effect shifting of the transmission.

Up until now, flexible cables such as push-pull cables have been commonly used in such applications. These cables however, often experience lost motion, frictional drag, sharp bends and high loading, which in some instances can create large variations between gear speeds which cannot be tolerated. Rigid linkages on the other hand, are better able to handle lost motion in high loading situations but they have the distinct disadvantage in that they cannot compensate for variations in motion without shifting gears. U.S. Pat. No. 3,616,709 entitled "Transmission Control Mechanism For A Tractor Having A Resiliently-Mounted Control Console" is one patent which employs a rigid link system such that relative motion is minimized when the shift lever is in a given position. However, there is still a need in the industry to provide a control linkage which can tolerate the relative motion which is imparted between the cab strucutre and the transmission of a vehicle while preventing displacement of the gear shift mechanism.

Now a control linkage has been invented which satisfies this problem.

SUMMARY OF THE INVENTION

Briefly, this invention relates to a control linkage for a vehicle such that the vehicle's transmission can be connected to a shift lever located in an isolated cab structure. The control linkage permits movement of the shift lever to obtain corresponding shifting of gear speeds within the transmission while compensating for relative motion between the cab structure and the transmission. The control linkage inludes a rotatable support shaft which is secured between the cab structure and the transmission and which is capable of angularly moving relative to both. A sleeve is positioned about the support shaft and is secured to it. The sleeve has a pair of outwardly extending radial arms, each of which contains a spherical joint positioned approximate to its outer end. Connected to the spherical joints are first and second rods which are aligned approximately perpendicular to the support shaft. The first rod is connected between the shift lever and one of the arms while the second rod is connected between the transmission and the other arm. As the cab structure moves relative to the transmission, the support shaft will angularly tilt between the cab structure and the transmission thereby minimizing the movement of the second rod. In this manner, the gear shift mechanism, which effects the different gear ratios, will remain in the position indicated by the control lever.

The general object of this invention is to provide a control linkage for a vehicle such as an agricultural or industrial tractor. A more specific object of this invention is to provide a control linkage which can compensate for relative motion between a vehicle's transmission and its isolated cab structure.

Another object of this invention is to provide a control linkage for a vehicle having a cab structure mounted for movement relative to its transmission, such that relative motion between the cab structure and transmission will not provide a false signal to the control linkage.

Still further, an object of this invention is to provide a control linkage which is simple in construction.

Other objects and advantages of the present invention will become more apparent to those skilled in the art in view of the following description and the accompanying drawings.

BRIEF DESCRIPTION OF THE DRAWINGS

FIG. 3 is a left side view of FIG. 1.

FIG. 4 is a line drawing of FIG. 3 showing the arm member in an initial position and in a displaced position.

DETAILED DESCRIPTION OF THE PREFERRED EMBODIMENT

Figure 1:
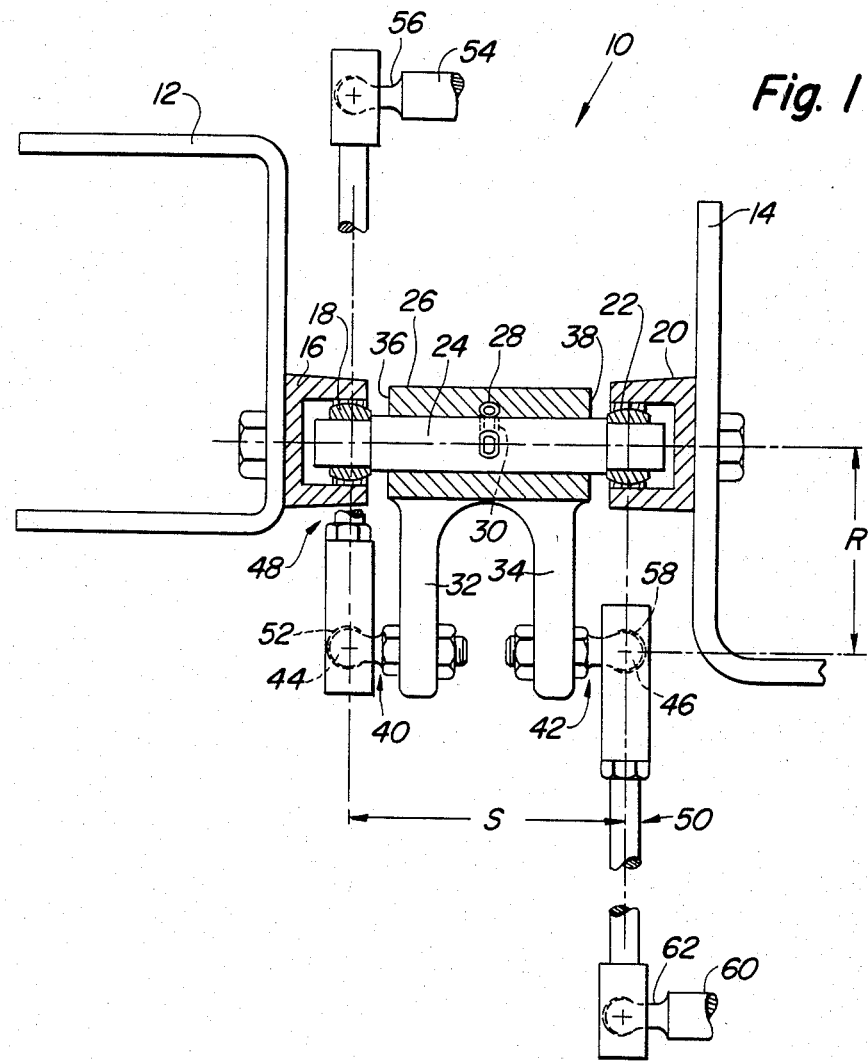
FIG. 1 is a front view of the control linkage.

Referring to FIGS. 1 and 3, a control linkage 10 is shown positioned on a vehicle having a cab structure 12 and a transmission 14. The transmission 14 is permanently attached to the frame of the vehicle while the cab structure 12 is mounted, such as by hydraulic mounts, shock absorbers or other means of isolation to the frame of the vehicle so as to move independent of the transmission 14. Secured to an outer surface of the cab structure 12 is a receptacle 16 which houses a ball bushing 18 and secured to an outer surface of the transmission 14 is a similar receptacle 20 housing a similar ball bushing 22. Preferably, the pair of ball bushings 18 and 22 are coaxially aligned and separated by a distance which minimizes the error introduced to the transmission 14 by motion of the cab structure 12. Secured between the ball bushings 18 and 22 is a support shaft 24 which is capable of rotating within the ball bushings 18 and 22 and which is also capable of angularly moving or tilting relative to the bushings 18 and 22 as the cab structure 12 is moved relative to the transmission 14. It should be noted that as the vehicle traverses over uneven ground, the cab structure 12 may move relative to the transmission 14. Such motion can create a change in distance between a control lever located in the cab structure 12 and a gear shift mechanism which is attached to the transmission 14.

Positioned about the support shaft 24 is a sleeve 26 which is secured thereto by a pin 28. The pin 28 engages a bore 30 formed in both the support shaft 24 and the sleeve 26. Although, the invention is described as having a sleeve secured to a shaft, it will be apparent to those skilled in the art that the shaft and sleeve can be integrally formed. Extending radially outward from the sleeve 26 is a pair of arms 32 and 34. Again, for simplicity sake, and not by way of limitation, the invention will be described as having a pair of arms 32 and 34, although it will be readily apparent to those skilled in the art that the sleeve 26 can have only one arm or a plurality of arms. The arms 32 and 34 are preferably spaced apart in a side-by-side arrangement with the arm 32 being positioned adjacent to an end surface 36 of the sleeve 26 while the other arm 34 is positioned adjacent to an opposite end 38. For certain arrangements it may be beneficial to position one arm opposite to and/or offset from the other arm so as to accommodate reverse direction of the input motion to the output motion and/or to accommodate variations in the input to the output ratio while still compensating for relative motion between the cab structure 12 and the transmission 14.

Located adjacent to the outer extremities of the arms 32 and 34 are attachment members 40 and 42, respectively, having spherical ends 44 and 46. First and second rods 48 and 50 are respectively attached to the ends 44 and 46. The first rod 48 contains a socket opening 52 having the spherical end 44 received therein to thereby form a ball joint permitting universal movement of the first rod 48. The opposite or upper end of the first rod 48, as shown in FIG. 1, is similarly universally connected to a shift lever 54, as at 56. The second rod 50 also contains a socket opening 58 formed in one end which receives the spherical end 46. The opposite or lower end of the second rod 50 is universally connected to a gear shift mechanism 60, as at 62. The universal connection will provide movement in at least 3 degrees of freedom.

Figure 2:
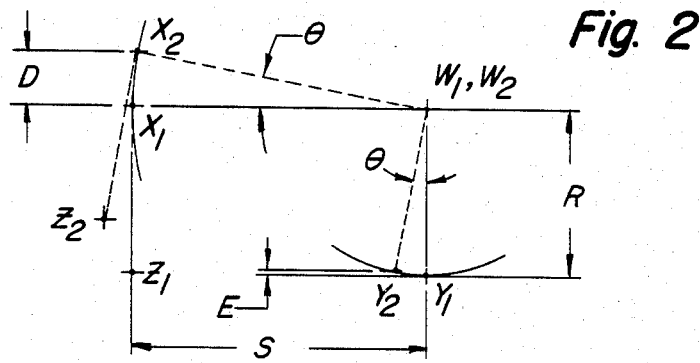
FIG. 2 is a line drawing of FIG. 1 showing an initial position and a displaced position for the linkage members.

Turning now to FIGS. 2 and 4, line diagrams are shown wherein the solid lines depict an initial position of the elements of the control linkage 10 while the dotted lines depict a displacement of the elements. Preferably, the support shaft 24 is aligned on the vehicle such that relative motion of the cab structure 12 to the transmission 14 causes displacement of one end of the support shaft 24 relative to the second end. This displacement should occur in the general direction of travel of the rod 48 which is preferably in a plane approximately perpendicular to the central axis of the support shaft 24. In FIG. 2, this displacement is represented by a distance D wherein the left end of the support shaft 24 will move from a point $X_1$ to a point $X_2$, while the right end of the support shaft 24 will remain essentially stationary and therefore $W_1$ is in the same location as $W_2$. As the left end of the support shaft 24 is displaced a distance D, the point of connection of the first rod 48 to the attachment member 40 will be displaced from an initial position $Z_1$, to a new position $Z_2$ while the point of connection of the second rod 50 to the spherical joint 46 will be displaced from an initial position $Y_1$ to a new position $Y_2$. One will notice that for a given angle $\theta$, the displacement of the second rod 50, denoted E, will be very small in relation to the movement D of the support shaft 24. Therefore, the control linkage 10 is able to compensate for a substantial amount of relative motion without causing the second rod 50 to move a distance which would cause the gear shift mechanism 60 to be displaced an undesired amount. If the gear shift mechanism 60 was displaced, it could cause an inadvertent gear shift or cause a detent device located in the mechanism to move to a null position between two adjacent gear speeds. In either case, the result could lead to an unwanted gear shift.

In constructing a control linkage 10 to meet one's need, the physical size and angle of displacement $\theta$, through which the support shaft 24 will pivot, can be determined by using the following mathematical equations:

$$E = R - R \cos \theta$$

$$R = A \sin \phi, \text{ and}$$

$$\theta = \arctan D/S$$

where:

A is the length of the arms 32 and 34 as measured from the central axis of the support shaft 24 to the centers of the spherical ends 44 and 46, respectively;

D is the displacement of the first rod 48 from its initial position $Z_1$ to a position $Z_2$;

E is the displacement of the second rod 50 from its initial position $Y_1$, to a position $Y_2$, which displacement is less than the maximum amount of displacement which would cause the gear shift mechanism to move an undesirable amount;

R is the vertical projection of A as measured from the central axis of the support shaft 24; and S is the length of the support shaft 24 as measured between the centers of the ball bushings 18 and 22.

Starting with a known maximum amount of displacement D which can exist, and knowing the maximum permissible value for E, one can size S to minimize the angle $\theta$. Likewise, the length of A and the angle $\phi$ can be sized to minimize R thereby producing a further reduction in the value of E.

It should be noted that compensation for relative motion is most effective when $\phi$ is equal to zero degrees and diminishes as $\phi$ varies from a null position. The null position is the position of the arm 32 or 34 lying along the horizontal axis, as shown in FIG. 4. It should also be noted that additional errors may be introduced into the system depending upon the amount of deviation of the rods 48 and 50 from a preferred initial position wherein they are aligned perpendicular to the central axis of the support shaft 24. In general, when the first and second rods 48 and 50 swing in a plane aligned approximately perpendicular to the central axis of the support shaft 24, the amount of error will be minimized as the length of the rods 48 and 50 is increased and as the angle $\theta$ decreases.

Lastly, the control linkage 10 permits shifting of the shift lever 54 even when the support shaft 24 is oscillating.

While the invention has been described in conjunction with a specific embodiment, it is to be understood that many alternatives, modifications, and variations will be apparent to those skilled in the art in light of the aforegoing description. Accordingly, this invention is intended to embrace all such alternatives, modifications, and variations which fall within the spirit and scope of the appended claims.

We claim:

1. A control linkage capable of compensating for relative motion between a first member which is isolated from a second member, said control linkage comprising:

(a) a support member rotatably and pivotally attached between said first and second members, said support member including radial arm means;

(b) first and second outwardly extending attachment devices joined to said radial arm means;

(c) a first rod connecting said first member to said first attachment device at a first joint; and (d) a second rod connecting said second member to said second attachment device at a second joint, said first and second joints lying approximately in respective planes which are parallel and pass through the respective points where said support member is pivotally attached to said first and second members, wherein displacement of said second rod from its original position to a second position, due to the presence of relative motion between said first and second members, is computed using the following equations:

$$E = R - R \cos \theta$$

$$R = A \sin \phi, \text{ and}$$

$$\theta = \arctan D/S$$

where:

A is the length of said arms as measured from the central axis of said support member to the centers of the spherical ends connecting the first and second rods to the respective arms;

D is the displacement of said first rod from its initial position to a second position;

E is the displacement of said second rod from its initial position to a second position, which displacement is less than the maximum amount of displacement which would cause said gear shift mechanism to move an undesirable amount;

R is the vertical projection of A as measured from the central axis of said support member; and S is the length of said support member as measured between the points where it is pivotally connected to said first and second members.

2. The control linkage of claim 1 wherein said radial arm means includes two arms which extend radially outward from said support member.

3. The control linkage of claim 1 wherein said first and second joints are ball joints which permit said attached rods to have motion in three degrees of freedom.

4. A control linkage for a vehicle having a transmission which is isolated from a cab structure and having a shift lever located in said cab structure, said control linkage permitting shifting of said shift lever to obtain corresponding shifting of a gear shift mechanism attached to said transmission while compensating for relative motion which occurs between said cab structure and said transmission as said vehicle traverses over uneven ground, said control linkage comprising:

(a) a pair of coaxially aligned bushings, one retained by said cab structure and the other by said transmission;

(b) a rotatable support shaft secured between said pair of bushings and being capable of angularly tilting relative to both said cab structure and said transmission;

(c) a sleeve positioned about said support shaft and secured thereto, said sleeve having a pair of outwardly extending radial arms arranged parallel to each other in a side-by-side relationship;

(d) attachment members connected to an end portion of each of said arms, each of said attachment members including a spherical end; and (e) first and second rods, each having a socket formed in one end thereof for receiving said respective spherical ends to thereby form first and second ball joints, said first rod being connected between said shift lever and one of said arms and said second rod being connected between said transmission and said other arm, wherein displacement of said second rod from its original position to a second position, due to the presence of relative motion between said cab structure and said transmission, is computed using the following equations:

$$E = R - R \cos \theta$$

$$R = A \sin \phi, \text{ and}$$

$$\theta = \arctan D/S$$

where:

A is the length of each of said arms as measured from the central axis of said support shaft to the points where said first and second rods are connected to said attachment members;

D is the displacement of the first rod from its initial position to a second position;

E is the displacement of the second rod from its initial position to a second position, which displacement is less than the maximum amount of displacement needed to cause said gear shift mechanism to move an undesirable amount;

R is the vertical projection of A as measured from the central axis of said support shaft; and S is the length of the support shaft as measured between the points where it is pivotally connected to said cab structure and said transmission.

5. The control linkage of claim 4 wherein said first and second rods are aligned approximately parallel to each other and approximately perpendicular to the central axis of said support shaft.

* * * * *